US012099845B2

(12) United States Patent
Hsieh et al.

(10) Patent No.: US 12,099,845 B2
(45) Date of Patent: Sep. 24, 2024

(54) LOAD REISSUING USING AN ALTERNATE ISSUE QUEUE

(71) Applicant: INTERNATIONAL BUSINESS MACHINES CORPORATION, Armonk, NY (US)

(72) Inventors: Jonathan Ting Hsieh, Poughkeepsie, NY (US); Gregory William Alexander, Pflugerville, TX (US); Aaron Tsai, Hyde Park, NY (US); Yossi Shapira, Shoham (IL)

(73) Assignee: International Business Machines Corporation, Armonk, NY (US)

( * ) Notice: Subject to any disclaimer, the term of this patent is extended or adjusted under 35 U.S.C. 154(b) by 28 days.

(21) Appl. No.: 17/807,243

(22) Filed: Jun. 16, 2022

(65) Prior Publication Data
US 2023/0409331 A1 Dec. 21, 2023

(51) Int. Cl.
*G06F 9/38* (2018.01)
*G06F 9/30* (2018.01)
*G06F 12/0875* (2016.01)

(52) U.S. Cl.
CPC ........ *G06F 9/3808* (2013.01); *G06F 9/30043* (2013.01); *G06F 9/3824* (2013.01); *G06F 9/3836* (2013.01); *G06F 9/3856* (2023.08); *G06F 12/0875* (2013.01); *G06F 2212/452* (2013.01)

(58) Field of Classification Search
CPC .. G06F 9/30043; G06F 9/3824; G06F 9/3836; G06F 9/3856
See application file for complete search history.

(56) References Cited

U.S. PATENT DOCUMENTS

| | | | |
|---|---|---|---|
| 5,201,041 A * | 4/1993 | Bohner | G11C 29/70 |
| | | | 711/E12.051 |
| 9,823,933 B2 | 11/2017 | Zou | |
| 9,928,075 B2 | 3/2018 | Alexander | |
| 9,983,875 B2 | 5/2018 | Chadha | |
| 10,241,925 B2 | 3/2019 | Mirza | |
| 10,846,095 B2* | 11/2020 | King | G06F 9/3842 |
| 11,194,574 B2 | 12/2021 | Dooley | |
| 2002/0078302 A1* | 6/2002 | Favor | G06F 12/0857 |
| | | | 711/E12.05 |
| 2002/0091914 A1* | 7/2002 | Merchant | G06F 9/3838 |
| | | | 712/E9.05 |
| 2007/0174556 A1 | 7/2007 | Brown | |

(Continued)

OTHER PUBLICATIONS

"Announcing IBM z16: Real-time AI for Transaction Processing at Scale and Industry's First Quantum-Safe System", BM, Apr. 5, 2022, 7 pages, <https://newsroom.ibm.com/2022-04-05-Announcing-IBM-z16-Real-time-AI-for-Transaction-Processing-at-Scale-and-Industrys-First-Quantum-Safe-System>. * Grace Period Disclosure*.

(Continued)

*Primary Examiner* — Andrew Caldwell
*Assistant Examiner* — Kasim Alli
(74) *Attorney, Agent, or Firm* — Edward J. Wixted, III

(57) ABSTRACT

In an approach, responsibility for reissuing a fetch micro-operation is allocated to a reissue queue subsequent to a cache miss corresponding to a cache and the fetch micro-operation. Responsive to higher level cache returning data to (Continued)

the cache, an issue selection algorithm of the issue queue is overridden to prioritize reissuing the fetch micro-operation.

17 Claims, 5 Drawing Sheets

(56) References Cited

U.S. PATENT DOCUMENTS

| | | | |
|---|---|---|---|
| 2009/0182944 A1* | 7/2009 | Comparan | G06F 12/0888 |
| | | | 711/146 |
| 2010/0138611 A1 | 6/2010 | Rappoport | |
| 2016/0239307 A1 | 8/2016 | Alexander | |
| 2016/0371091 A1 | 12/2016 | Brownscheidle | |
| 2017/0293489 A1* | 10/2017 | Ayub | G06F 9/3856 |
| 2017/0364356 A1* | 12/2017 | Ayub | G06F 9/3851 |
| 2018/0196678 A1* | 7/2018 | Thompto | G06F 9/3856 |
| 2018/0232316 A1 | 8/2018 | Mirza | |
| 2019/0163471 A1 | 5/2019 | King | |
| 2020/0257535 A1 | 8/2020 | Fatehi | |
| 2021/0026632 A1 | 1/2021 | Dooley | |
| 2021/0200538 A1 | 7/2021 | Sala | |
| 2021/0406023 A1 | 12/2021 | Ayub | |

OTHER PUBLICATIONS

Fu et al., "Optimizing Issue Queue Reliability To Soft Errors On Simultaneous Multithreaded Architectures", Printed May 5, 2022, 8 pages.

Kotra et al., "Improving The Utilization Of Micro-Operation Caches In x86 Processors", Proceedings of the 2020 53rd Annual IEEE/ACM International Symposium on Microarchitecture (MICRO), Oct. 17 -21, 2020, Virtual Conference, 13 pages.

Morancho et al., "Predicting L2 Misses to Increase Issue-Queue Efficacy", Printed May 5, 2022, 7 pages.

Moreshet et al., "Complexity-Effective Issue Queue Design Under Load-Hit Speculation", Printed May 5, 2022, 10 pages.

Sakai et al., "Rearranging Random Issue Queue With High IPC And Short Delay", Proceedings of the 2018 IEEE 36th International Conference on Computer Design (ICCD), Oct. 7-10, 2018, Orlando, FL, 9 pages.

* cited by examiner

LOAD REISSUING USING AN ALTERNATE ISSUE QUEUE

STATEMENT REGARDING PRIOR DISCLOSURES BY THE INVENTOR OR A JOINT INVENTOR

Various aspects of the present invention have been disclosed by an inventor or a joint inventor in the product IBM® z16™, publicly announced on Apr. 5, 2022. The following disclosure is submitted under 35 U.S.C. § 102(b)(1)(A):

(i) "Announcing IBM z16: Real-time AI for Transaction Processing at Scale and Industry's First Quantum-Safe System." IBM Newsroom, 5 Apr. 2022, https://newsroom.ibm.com/2022-04-05-Announcing-IBM-z16-Real-time-AI-for-Transaction-Processing-at-Scale-and-Industrys-First-Quantum-Safe-System.

BACKGROUND

The present invention relates to issue queues and reissues, and more specifically, to reducing load reissue latency using a main issue queue and an alternate load reissue queue.

A complex instruction set computer (CISC) is a computer architecture in which single instructions can execute several low-level operations (such as a load from memory, an arithmetic operation, or a memory store) or are capable of multi-step operations or addressing modes with a single instruction.

A micro-operation (pop) is a detailed low-level instruction used in some designs to implement complex machine instructions (e.g., macro-instructions). Typically, micro-operations perform basic operations on data stored in one or more registers, including transferring data between registers or between registers and external buses of the central processing unit (CPU), and performing arithmetic or logical operations on registers. In a typical instruction cycle, each step of a macro-instruction is decomposed during its execution so the CPU determines and steps through a series of micro-operations. The execution of micro-operations is performed under control of a CPU's control unit, which decides on the micro-operation's execution while performing various optimizations such as reordering, fusion, and caching.

An issue queue issues and, if necessary, reissues ready micro-operations, typically based on their ages (e.g., oldest in the instruction stream is issued/reissued first).

SUMMARY

According to some embodiments of the present invention, a computer-implemented method, computer program product, and computer system are provided. In one embodiment, subsequent to a cache miss corresponding to a cache and a fetch micro-operation issuing from an issue queue, responsibility for reissuing the fetch micro-operation is allocated to a reissue queue. In one embodiment, responsive to higher level cache returning data to the cache, an issue selection algorithm of the issue queue is overridden to prioritize reissuing the fetch micro-operation.

DETAILED DESCRIPTION

Embodiments of the present invention recognize that an issue queue issues and reissues ready micro-operations based on the corresponding ages of the micro-operations, for example, the oldest micro-operation in the instruction stream may be issued first. A micro operation (μop) is a part of, or whole of, an instruction, such as, for example, a complex instruction set computer (CISC) instruction set architecture (ISA) instruction. Embodiments of the present invention recognize that cache miss latency is a major contributor to overall processor performance and that reissuing a micro-operation, as early as possible once data from higher level caches is available, is desirable. Embodiments of the present invention further recognize that there is a fixed minimum latency from the time a cache line is written in L1 cache to when a micro-operation is able to read the written data. Embodiments of the present invention further recognize that existing solutions allow reissue of a micro-operation from the issue queue (i.e., mark the micro-operation ready) to read data from L1 cache at the earliest point after the above described fixed minimum latency. However, embodiments of the present invention further recognize that, even if a micro-operation is marked as ready, the micro-operation may or may not actually issue at the earliest time based on the issue queue selection algorithm that is in use (e.g., an algorithm that follow an oldest ready micro-instruction first type approach).

Embodiments of the present invention recognize that, while the cache can be read a certain number of cycles after the cache is written, the data itself is available in pipeline registers outside of the cache before the cache array write occurs and that such data can be read by a micro-operation if the micro-operation is issued at exactly the right cycle. Embodiments of the present invention recognize that marking a micro-operation as ready in the issue queue allows, but does not guarantee, issue at a certain point and describes an approach that, instead, overrides the normal issue selection algorithm to force the appropriate micro-operation to reissue at exactly the correct cycle to read the data in the pipeline registers outside the cache. Embodiments of the present invention recognizes that such an approach allows the data to be returned several cycles earlier then if the data was returned via reading the cache and that the decreased latency improves overall processor performance.

Figure 1:
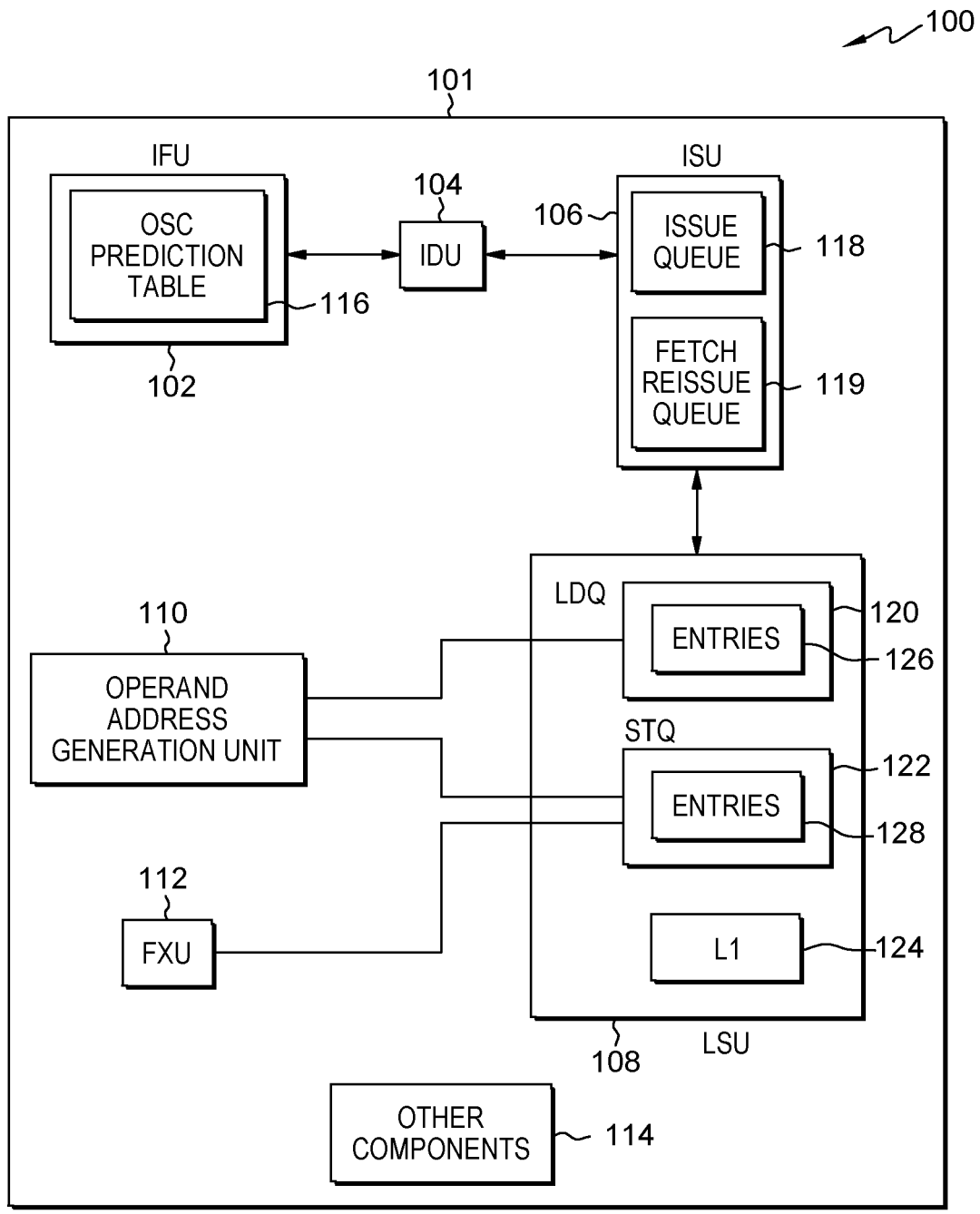
FIG. 1 is a functional block diagram of a computing system, in accordance with an embodiment of the present invention.

FIG. 1 is a block diagram illustrating one example of a computing system 100 applicable to one or more processes, instructions, and data in accordance with one or more embodiments of the present invention. Computing system 100 comprises processor 101. The processor 101 comprises a single integrated circuit processor such as a superscale processor, which, includes various execution units, registers, buffers, memories, and other functional units that are formed by integrated circuitry. The processor 101, in one embodiment, is capable of issuing and executing instructions out-of-order. In an embodiment, processor 101 may be more than one processor.

The processor 101, in one embodiment, comprises an instruction fetch unit (IFU) 102, an instruction decode unit (IDU) 104, an instruction issue unit (ISU) 106, a load/store unit (LSU) 108, an operand address generation unit 110, a fixed point unit 112 (or any other execution unit(s)), and other components 114 such as various other execution units, registers, buffers, memories, and other functional units. The IFU 102, in one embodiment, comprises an operand-store-compare (OSC) prediction table 116. The OSC prediction table 116 creates entries based on the instruction address of a load and remembers one or more flags for the load.

The ISU 106, in this embodiment, comprises an issue queue 118 and a fetch reissue queue 119. The ISU 106 may be able to pass authority over selected entries between a primary controller of the issue queue 118 and an alternate controller of the fetch reissue queue 119 to optimize between different issue algorithms associated with each queue. The various controllers may have different latencies from a given ready event to issue, and may be able to select using more information, such as, for example, micro-operation age. In some embodiments, ISU 106 causes control and data fields necessary to issue a micro-operation to only be maintained in issue queue 118 and/or fetch reissue queue 119, and not in alternative controllers or queues in order to, for example, more efficiently utilize transistors.

The issue queue 118 holds decoded instructions that are dispatched and temporarily placed in the issue queue 118. The instruction are held in the issue queue 118 until all their required operands are available. From the issue queue 118, instructions can be issued opportunistically to execution units, e.g., LSU 108, FXU 112, etc., of the processor 101. In other words, the instructions can be issued out-of-order. The instructions, however, are maintained in the issue queue 118 until execution of the instructions is complete, and the result data, if any, are written back, in case any of the instructions need to be reissued. However, if any of the instructions need to be reissued due to an L1 cache 124 miss, responsibility for reissuing such instructions is allocated to fetch reissue queue 119. Fetch reissue queue 119 is described in further detail below with respect to FIGS. 2 through 4 and, generally, is capable of overriding the normal issue selection algorithm of issue queue 118 to force a micro-operation reissue at exactly the right cycle to enable data to be read from, for example, a general purpose register outside of the L1 cache 124 and prior to higher level cache writing the data to the L1 cache 124. In other embodiments, rather than a general purpose register, data may be read from other locations such as a vector register or other registers. Accordingly, fetch reissue queue 119 allows data to be returned several cycles earlier than if the data was returned via reading the L1 cache 124, which may decrease latency and improve overall processor performance. Fetch reissue queue 119 may comprise a second controller with respect to issue queue 118, the second controller having the ability to override the micro-operation selection algorithm from issue queue 118.

The LSU 108, in some embodiments, comprises a load queue (LDQ) 120, a store queue (STQ) 122, and an L1 cache 124. The LDQ 120 and the STQ 122 each comprise entries 126, 128, respectively, that track additional information associated with outstanding load and store instructions. The entries 126 in the LDQ 120 are the same as traditional entries in current out-of-order processors. The entries 128 in the STQ 122 are different than traditional entries in current out-of-order processors. The entries 128 tracks information associated with outstanding store instructions. It should be noted that various embodiments of the present invention are not limited to the configuration of the processor 101 as shown in FIG. 1. The embodiments of the present invention are applicable to a variety of architectures which can vary from the example shown in FIG. 1.

In general, the IFU 102 fetches instruction codes stored in an I-cache, which can be part of the L1 cache 124. These fetched instruction codes are decoded by the IDU 104 into instruction processing data. Once decoded, the instructions are dispatched and temporarily placed in an appropriate issue queue 118. The instructions are held in the issue queue 118 until all their required operands are available. From the issue queue(s) 118, instructions can be issued opportunistically to the execution units, e.g., LSU 108, FXU 112, etc., of the processor 101 for execution. In other words, the instructions can be issued out-of-order. The instructions, however, are maintained in the issue queue(s) 118 until execution of the instructions is complete, and the result data, if any, are written back, in case any of the instructions need to be reissued, except for in circumstances where a reissue is necessary due to an L1 cache 124 miss. When a reissue is necessary due to an L1 cache 124 cache miss, responsibility for the reissue is allocated to fetch reissue queue 119.

During execution within one of the execution units, e.g., LSU 108, FXU 112, an instruction receives operands, if any, from one or more architected and/or rename registers within a register file coupled to the execution unit. After an execution unit finishes execution of an instruction, the execution unit writes the result to the designated destination as specified by the instruction and removes the instruction from the issue queue and the completion of instructions can then be scheduled in program order. The operand address generation unit 110 generates operand address information for load and store instructions and writes these addresses into the respective LDQ 120 and the STQ 122. The FXU 112 writes data values in the STQ 122.

The LSU 108, as discussed above, receives load and store instructions from the ISU 106, and executes the load and store instructions. In general, each load instruction includes address information specifying an address of needed data. In one embodiment, the LSU 108 supports out of order executions of load and store instructions, thereby achieving a high level of performance. In one embodiment, the LSU 108 is pipelined. That is, the LSU 108 executes load and store instructions via a set of ordered pipeline stages performed in sequence.

Figure 2:
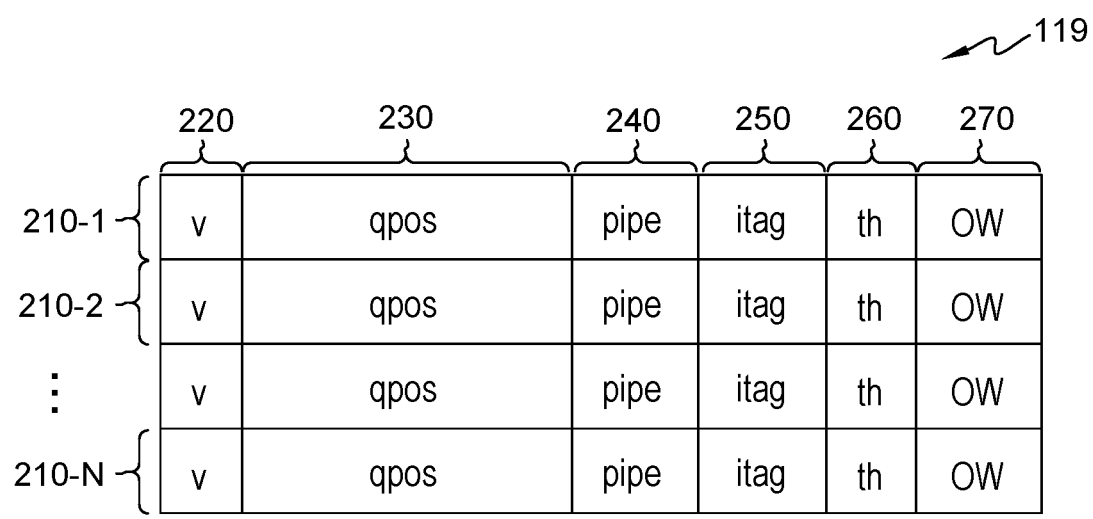
FIG. 2 is an example of a fetch reissue queue and associated entries, in accordance with an embodiment of the present invention.

FIG. 2 shows one example of a fetch reissue queue 119 and associated entries 210-1 through 210-N, according to one embodiment of the present invention. Each entry in the depicted embodiment includes the following fields: valid bit information 220, main issue queue position 230, issue pipe identifier 240, micro-operation tag 250, micro-operation thread identifier (ID) 260, and data ID 270. Subsequent to an L1 cache miss, responsibility to reissuing that micro-operation can be given to fetch reissue queue 119, instead of being returned to issue queue 118. An entry 210-1 through 210-N is allocated in such instances by setting the valid bit information 220 to one and setting the other five fields (i.e., main issue queue position 230, issue pipe identifier 240, micro-operation tag 250, micro-operation thread identifier (ID) 260, and data ID 270) with the corresponding micro-operation information.

A pipeline flush is a procedure enacted by a CPU when the CPU cannot ensure correct processing of the instruction pipeline in the next clock cycle. If a pipeline flush occurs, flush tags are compared against micro-operation tags 250 and micro-operation thread identifiers 260 in the fetch reissue queue 119 to determine if any entries 210-1 through 210-N have been flushed. If so, valid bit information 220 for each flushed entry 210-1 through 210-N is, in some embodiments, set to zero.

Figure 3:
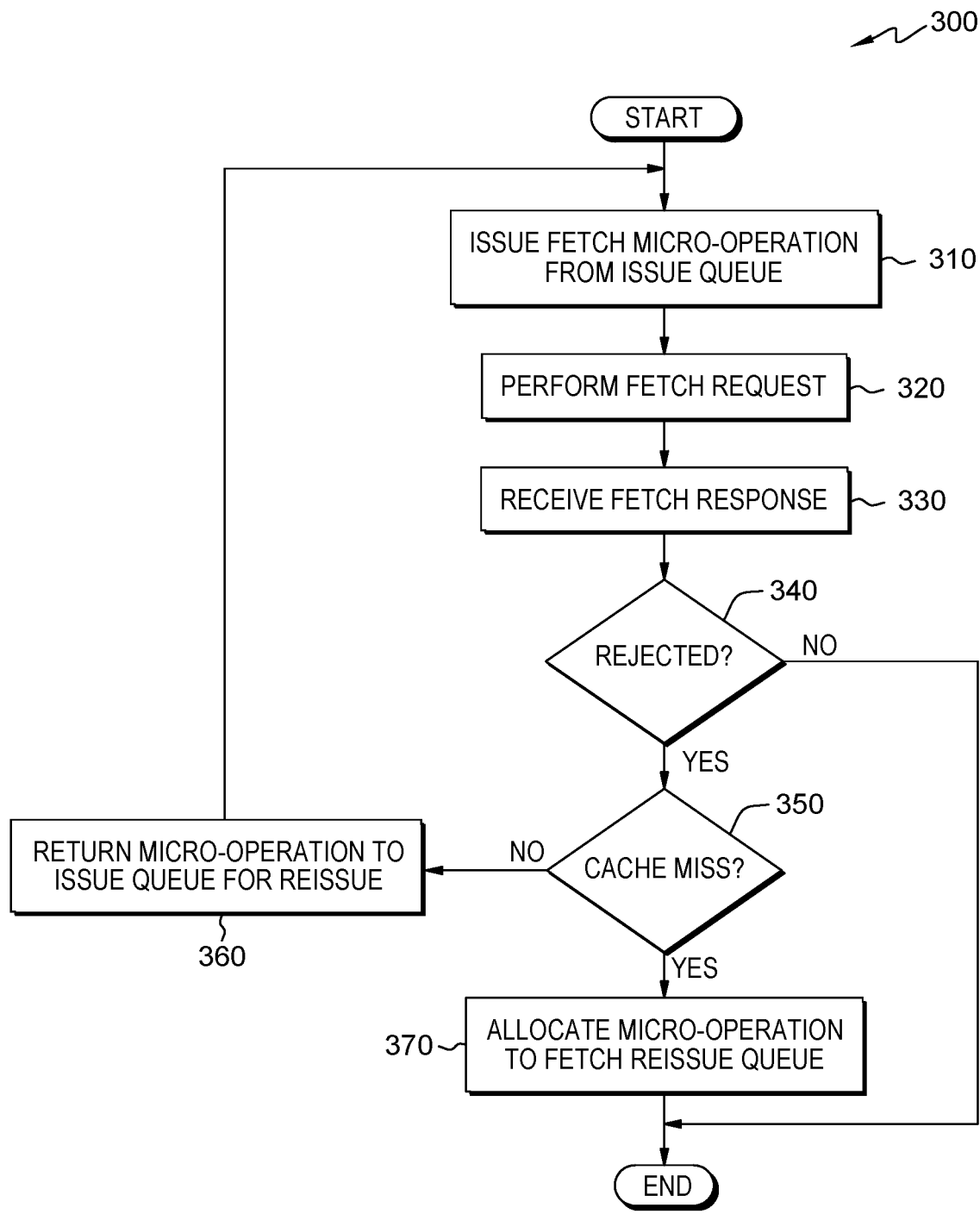
FIG. 3 is a flowchart depicting operational steps for issuing micro-operations from an issue queue and, subsequent to a cache miss, allocating reissue responsibility to a fetch reissue queue, in accordance with an embodiment of the present invention.

FIG. 3 is a flowchart of a workflow 300, depicting operational steps for issuing micro-operations from an issue queue 118 and, subsequent to a cache miss, allocating reissue responsibility to a fetch reissue queue 119, in accordance with one embodiment of the present invention. In one embodiment, the steps of the workflow 300 are performed by ISU 106 and/or LSU 108. Alternatively, steps of the workflow 300 can be performed by a program or set of logic capable of working with ISU 106 and/or LSU 108.

In step 310, ISU 106 issues a fetch micro-operation from issue queue 118. ISU 106 selects a particular micro-operation based on an issue selection algorithm. In some embodiments, the issue selection algorithm is based on the ages of ready micro-operations in issue queue 118. Typically, the oldest micro-instruction in the instruction stream is issued first. Issue queue 118 includes valid to issue bits and ready to issue bits corresponding to each entry in issue queue 118. A valid bit is set when an entry for a micro-operation is written to the issue queue and is reset when the micro-operation is read. A ready to issue bit is set when all register dependencies and cache lines corresponding to issuing the micro-operation of an entry are available. As is described in further detail with reference to FIG. 4, a valid bit of issue queue 118 may also be set by fetch reissue queue 119 during a subsequent reissue of a micro-operation that originally had a cache miss.

In step 320, LSU 108 performs a fetch request for necessary data corresponding to the selected micro-operation from L1 cache 124.

In step 330, LSU 108 receives a fetch response for the micro-operation, the fetch response comprising the requested data or an indication of rejection due to, for example an L1 cache 124 miss.

In decision 340, ISU 106 or LSU 108 determines whether the micro-operation was rejected and, accordingly, needs to be reissued. A determination as to whether the micro-operation was rejected is made based on the received fetch response for the micro-operation.

If ISU 106 or LSU 108 determines the requested data was returned (decision 340, no branch), the data associated with the micro-operation is successfully returned and workflow 300 is complete. If ISU 106 or LSU 108 determines the requested data was not returned and/or an indication of rejection was received in response to the fetch request (decision 340, yes branch), ISU 106 or LSU 108 determines whether the rejection was as a result of an L1 cache 124 miss (decision 350).

In decision 350, ISU 106 or LSU 108 determines whether the processing of the micro-operation was rejected due to an L1 cache 124 miss. As described above, the fetch response received by LSU 108 may include an indication or notification of rejection which may, for example, specify a reason for rejection.

If ISU 106 or LSU 108 determines the micro-operation rejection was not the result of an L1 cache 124 miss (decision 350, no branch), ISU 106 returns the micro-operation to the issue queue for reissue (see step 360). If ISU 106 or LSU 108 determines the micro-operation rejection was the result of an L1 cache 124 miss (decision 350, yes branch), ISU 106 allocates the micro-operation to fetch reissue queue 119 (see step 370).

In step 360, ISU 106 returns the micro-operation to issue queue 118 for reissue and ISU 106 reissues the micro-operation according to the normal issue selection algorithm of issue queue 118.

In step 370, ISU 106 allocates the micro-operation to fetch reissue queue 119, a separate issue queue that may be, for example, a separate controller with respect to issue queue 118. The details of allocating the micro-operation to fetch reissue queue and the subsequent steps that a performed to process a reissue of a micro-instruction allocated to fetch reissue queue 119 are described in further detail with respect to FIG. 4.

Figure 4:
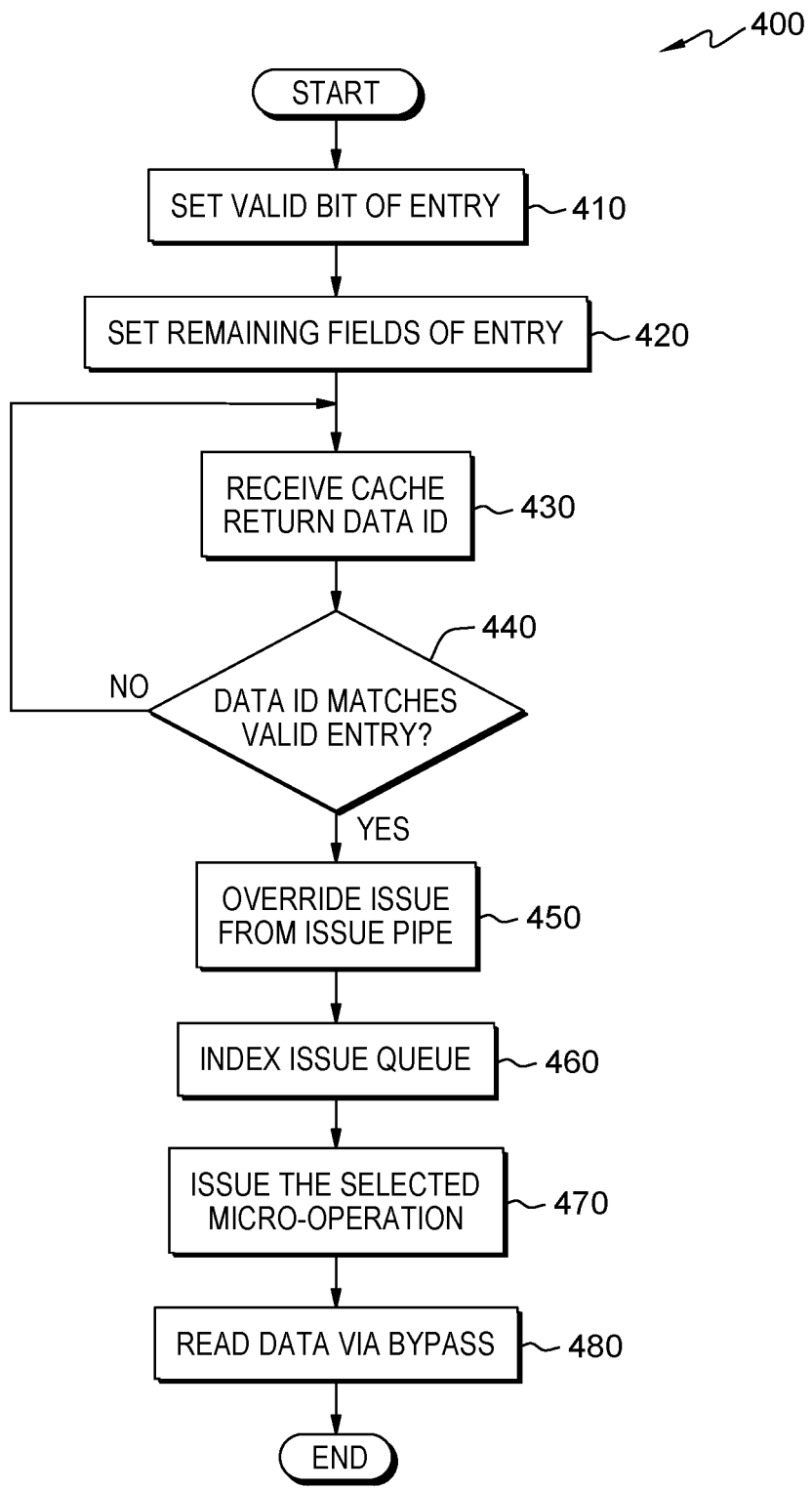
FIG. 4 is a flowchart depicting operational steps for allocating a micro-operation to a fetch reissue queue and processing a reissue of the micro-operation upon higher level cache returning data of interest, in accordance with an embodiment of the present invention.

FIG. 4 is a flowchart of a workflow 400, depicting operation steps for allocating a micro-operation to fetch reissue queue 119 and processing a reissue of the micro-operation upon higher level cache returning the data (e.g., octoword) of interest, in accordance with one embodiment of the present invention. In one embodiment, the steps of the workflow 400 are performed by ISU 106 and/or LSU 108. Alternatively, steps of the workflow 400 can be performed by a program or set of logic capable of working with ISU 106 and/or LSU 108.

In step 410, ISU 106 sets a bit for valid bit information 220 of an entry of fetch reissue queue 119. In some embodiments, ISU 106 sets valid bit information 220 to one. Similar to issue queue 118, setting the valid bit information 220 indicates that the entry for the micro-operation is written to fetch reissue queue 119 and valid bit information 220 is reset when the micro-operation is read.

In step 420, ISU 106 sets the remaining fields of the entry of fetch reissue queue 119 corresponding to the micro-operation. The particular fields are described with reference to FIG. 2 and include, for example, main issue queue position 230, issue pipe identifier 240, micro-operation tag 250, micro-operation thread identifier (ID) 260, and data ID 270. Each of the fields are populated using information that corresponds to the micro-operation.

In step 430, ISU 106 receives cache return data ID information. The data ID information may correspond to a smallest granularity of data that is returned by the higher level cache at any given time. Such data may be, for example, an octoword, quadword, doubleword, word, etc. Upon higher level cache returning data (e.g., an octoword), ISU 106 may receive data ID information corresponding to the data that is being retrieved from higher level cache to L1 cache 124.

In decision 440, ISU 106 determines whether the received data ID matches data ID 270 of an entry of fetch reissue queue 119 that has the valid bit information 220 set. ISU 106 compares the received data ID to the data ID 270 field of each entry of fetch reissue queue 119.

If ISU 106 determines that the received data does not match the data ID 270 field of any entry of fetch reissue queue 119 (decision 440, no branch), ISU 160 waits to receive additional cache return data ID information (see step 430). If ISU 106 determines that the received data does match the data ID 270 field (decision 440, yes branch), ISU 106 overrides issue from the correct issue pipe (see step 450).

In step 450, ISU 106 overrides issue from the correct issue pipe. More particularly, ISU 106 overrides any issuing of issue queue 118 such that the respective entry of fetch reissue queue 119 that is ready for reissue is prioritized. The correct issue pipe is selected from the entry of fetch reissue queue 119 based on the data populated in the issue pipe identifier 240 field.

In step 460, ISU 106 indexes the issue queue 118. ISU 106 indexes the issue queue 118 based on the position indicated in the main issue queue position 230 field of the entry of fetch reissue queue 119 corresponding to the micro-operation that is to be reissued. ISU 106 sets a valid to issue bit of issue queue 118 that corresponds to the micro-operation that is to be reissued.

In step 470, ISU 106 issues the selected micro-operation. As described above, the selected micro-operation is a micro-operation of fetch reissue queue 119 that is to be reissued based on a previous cache miss.

In step 480, ISU 106 or LSU 108 reads the data of interest for the micro-operation via a bypass of the L1 cache 124. More particularly, the data is read by bypassing the pipeline latch data around the L1 cache 124 to a general purpose register target that is outside of the L1 cache. The data is essentially pipelined write data that is available for exactly one cycle and the reissue must occur at this cycle or the reissue will have to wait until after the write of the data to the L1 cache 124. By accessing the data in the pipeline registers outside of the L1 cache, the data is able to be returned several cycles earlier than if the data was returned via reading the L1 cache 124 which may decrease latency and improve overall processor performance.

Figure 5:
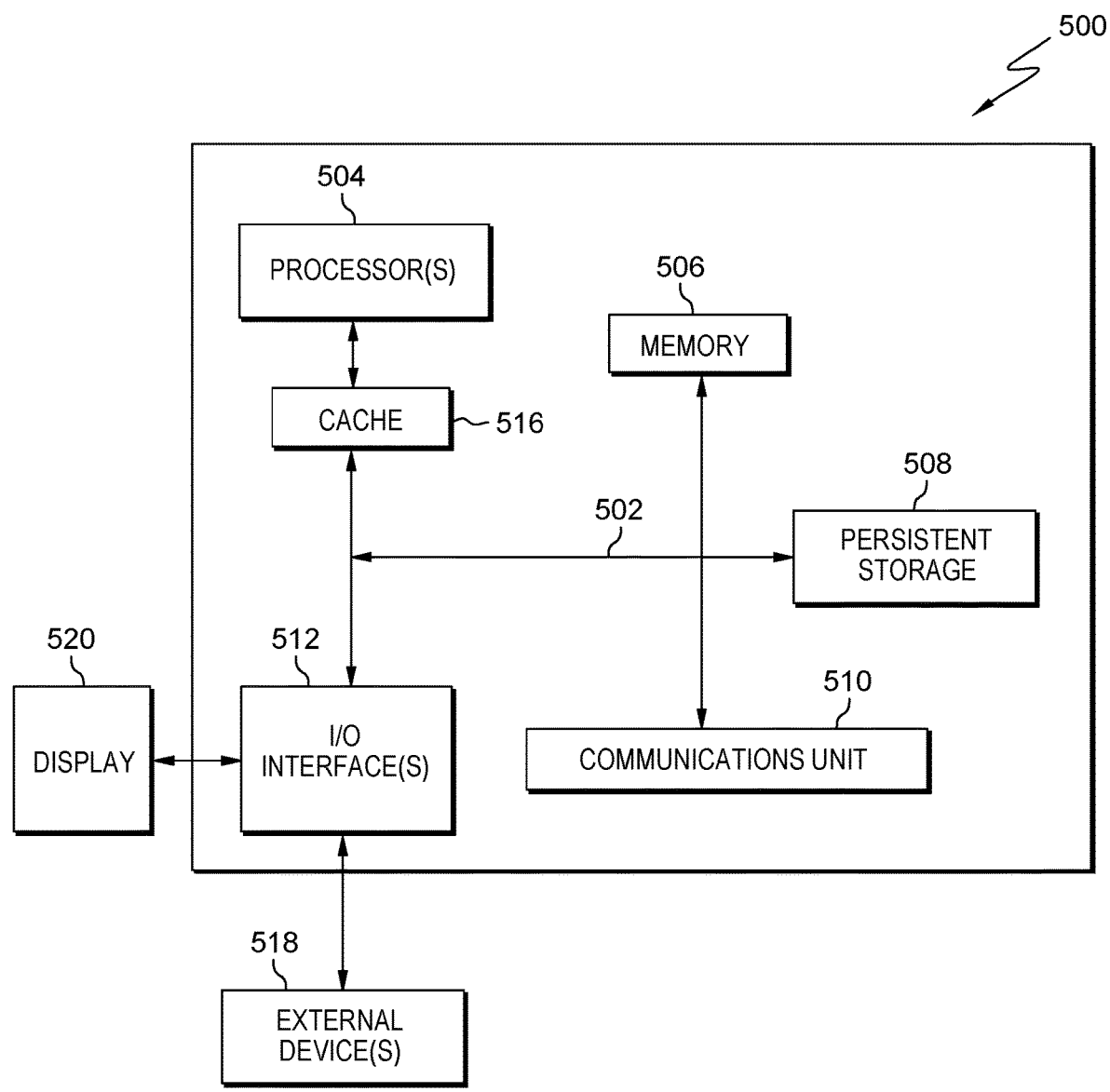
FIG. 5 is a block diagram of the computer system of FIG. 1, in accordance with an embodiment of the present invention.

FIG. 5 depicts a block diagram of components of computing system 100, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Computing system 100 includes communications fabric 502, which provides communications between cache 516, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses or a crossbar switch.

Memory 506 and persistent storage 508 are computer readable storage media. In this embodiment, memory 506 includes random access memory (RAM). In general, memory 506 can include any suitable volatile or non-volatile computer readable storage media. Cache 516 is a fast memory that enhances the performance of computer processor(s) 504 by holding recently accessed data, and data near accessed data, from memory 506.

Program instructions and data used to practice embodiments of the present invention may be stored in persistent storage 508 and in memory 506 for execution by one or more of the respective computer processors 504 via cache 516. In an embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices. In these examples, communications unit 510 includes one or more network interface cards. Communications unit 510 may provide communications through the use of either or both physical and wireless communications links. Program instructions and data used to practice embodiments of the present invention may be downloaded to persistent storage 508 through communications unit 510.

I/O interface(s) 512 allows for input and output of data with other devices that may be connected to computing system 100. For example, I/O interface 512 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention can be stored on such portable computer readable storage media and can be loaded onto persistent storage 508 via I/O interface(s) 512. I/O interface(s) 512 also connect to a display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
    subsequent to a cache miss corresponding to a lower level cache and a fetch micro-operation issuing from an issue queue, allocating responsibility for reissuing the fetch micro-operation to a reissue queue; and
    responsive to higher level cache returning data, overriding an issue selection algorithm of the issue queue to prioritize reissuing the fetch micro-operation, wherein overriding the issue selection algorithm comprises:
        overriding micro-operation issuance from an issue pipe specified by an issue pipe identifier field of an entry of the reissue queue; and
        indexing the issue queue at a position specified by an issue queue position field of the entry.

2. The computer-implemented method of claim 1, wherein allocating responsibility for reissuing the fetch micro-operation to the reissue queue further comprises:
    setting a valid bit of the entry of the reissue queue; and
    setting remaining fields of the entry with information corresponding to the fetch micro-operation.

3. The computer-implemented method of claim 2, wherein the remaining fields comprise the issue queue position field, the issue pipe identifier field, a micro-operation tag field, a micro-operation thread identifier (ID) field, and a data ID field.

4. The computer-implemented method of claim 3, further comprising:
receiving a data ID from a cache return; and
determining (i) the data ID matches the data ID field of the entry and (ii) the valid bit of the entry is set.

5. The computer-implemented method of claim 4, wherein the data ID from the cache return is associated with a smallest granularity of data returned by the higher level cache.

6. The computer-implemented method of claim 1, wherein reissuing the fetch micro-operation comprises:
reading the data from a pipeline register, wherein reading the data from the pipeline register occurs in a cycle prior to writing the data to the lower level cache.

7. The computer-implemented method of claim 1, wherein reissuing the fetch micro-operation comprises:
reading the data in a pipeline register outside of the lower level cache, wherein the data is available in the pipeline register for one cycle and during the one cycle, the data is not yet written to the lower level cache.

8. A computer program product comprising:
one or more computer readable storage media, and program instructions collectively stored on the one or more computer readable storage media, the program instructions comprising:
program instructions to, subsequent to a cache miss corresponding to a lower level cache and a fetch micro-operation issuing from an issue queue, allocate responsibility for reissuing the fetch micro-operation to a reissue queue; and
program instructions to, responsive to higher level cache returning data, override an issue selection algorithm of the issue queue to prioritize reissuing the fetch micro-operation, wherein the program instructions to override the issue selection algorithm comprise:
program instructions to override micro-operation issuance from an issue pipe specified by an issue pipe identifier field of an entry of the reissue queue; and
program instructions to index the issue queue at a position specified by an issue queue position field of the entry.

9. The computer program product of claim 8, wherein program instructions to allocate responsibility for reissuing the fetch micro-operation to the reissue queue further comprise:
program instructions to set a valid bit of the entry of the reissue queue; and
program instructions to set remaining fields of the entry with information corresponding to the fetch micro-operation.

10. The computer program product of claim 9, wherein the remaining fields comprise the issue queue position field, the issue pipe identifier field, a micro-operation tag field, a micro-operation thread identifier (ID) field, and a data ID field.

11. The computer program product of claim 10, further comprising:
program instructions, collectively stored on the one or more computer readable storage media, to receive a data ID from a cache return; and
program instructions, collectively stored on the one or more computer readable storage media, to determine (i) the data ID matches the data ID field of the entry and (ii) the valid bit of the entry is set.

12. The computer program product of claim 8, wherein program instructions to reissue the fetch micro-operation comprise:
program instructions to read the data from a pipeline register, wherein reading the data from the pipeline register occurs in a cycle prior to writing the data to the lower level cache.

13. A computer system comprising:
one or more computer processors, one or more computer readable storage media, and program instructions collectively stored on the one or more computer readable storage media for execution by at least one of the one or more computer processors, the program instructions comprising:
program instructions to, subsequent to a cache miss corresponding to a lower level cache and a fetch micro-operation issuing from an issue queue, allocate responsibility for reissuing the fetch micro-operation to a reissue queue; and
program instructions to, responsive to higher level cache returning data, override an issue selection algorithm of the issue queue to prioritize reissuing the fetch micro-operation, wherein the program instructions to override the issue selection algorithm comprise:
program instructions to override micro-operation issuance from an issue pipe specified by an issue pipe identifier field of an entry of the reissue queue; and
program instructions to index the issue queue at a position specified by an issue queue position field of the entry.

14. The computer system of claim 13, wherein program instructions to allocate responsibility for reissuing the fetch micro-operation to the reissue queue further comprise:
program instructions to set a valid bit of the entry of the reissue queue; and
program instructions to set remaining fields of the entry with information corresponding to the fetch micro-operation.

15. The computer system of claim 14, wherein the remaining fields comprise the issue queue position field, the issue pipe identifier field, a micro-operation tag field, a micro-operation thread identifier (ID) field, and a data ID field.

16. The computer system of claim 15, further comprising:
program instructions, collectively stored on the one or more computer readable storage media for execution by at least one of the one or more computer processors, to receive a data ID from a cache return; and
program instructions, collectively stored on the one or more computer readable storage media for execution by at least one of the one or more computer processors, to determine (i) the data ID matches the data ID field of the entry and (ii) the valid bit of the entry is set.

17. The computer system of claim 13, wherein program instructions to reissue the fetch micro-operation comprise:
program instructions to read the data from a pipeline register, wherein reading the data from the pipeline register occurs in a cycle prior to writing the data to the lower level cache.

* * * * *